(12) United States Patent  
Lippert et al.

(10) Patent No.: US 10,054,780 B2
(45) Date of Patent: Aug. 21, 2018

(54) MICROSCOPE

(71) Applicant: Carl Zeiss Microscopy GmbH, Jena (DE)

(72) Inventors: Helmut Lippert, Jena (DE); Ralf Wolleschensky, Jena (DE); Alexander Rohrbach, Freiburg (DE); Florian Fahrbach, Freiburg (DE)

(73) Assignee: Carl Zeiss Microscopy GmbH, Jena (DE)

( * ) Notice: Subject to any disclaimer, the term of this patent is extended or adjusted under 35 U.S.C. 154(b) by 0 days.

(21) Appl. No.: 14/249,921

(22) Filed: Apr. 10, 2014

(65) Prior Publication Data

US 2015/0070757 A1 Mar. 12, 2015

Related U.S. Application Data

(63) Continuation of application No. 12/809,136, filed as application No. PCT/EP2008/010455 on Dec. 10, 2008, now abandoned.

(30) Foreign Application Priority Data

Dec. 20, 2007 (DE) .................. 10 2007 063 274

(51) Int. Cl.
*G02B 21/06* (2006.01)
*G02B 21/16* (2006.01)
(Continued)

(52) U.S. Cl.
CPC ............ *G02B 21/06* (2013.01); *G02B 21/16* (2013.01); *G02B 27/0911* (2013.01);
(Continued)

(58) Field of Classification Search
CPC .... G01N 21/6458; G01N 21/64; G01N 21/65; G01N 2021/6421; G01N 21/648;
(Continued)

(56) References Cited

U.S. PATENT DOCUMENTS 4,826,299 A 5/1989 Powell
5,602,643 A * 2/1997 Barrett .................... 356/495
(Continued)

FOREIGN PATENT DOCUMENTS

DE 102 57 423 6/2004
DE 10 2005 027 077 5/2006
(Continued)

OTHER PUBLICATIONS

Breuninger et al. "Lateral Modulation boosts image quality in a single plane illumination fluorescence microscopy," Jul. 1, 2007, Optics Letters vol. 32 pp. 1938-1940.*
(Continued)

*Primary Examiner* — Thomas K Pham
*Assistant Examiner* — Sharrief Broome
(74) *Attorney, Agent, or Firm* — Haug Partners LLP

(57) ABSTRACT

A microscope including an imaging objective for imaging a sample on a detector and means for illuminating the sample with a light sheet in the focus plane of the imaging objective. The illumination means includes an illumination source which emits coherent light, and Bessel optics which generate at least two plane waves from the light beam and give propagation directions for the plane waves. The propagation direction of each of the plane waves encloses an acute angle with the focus plane in each instance, the magnitude of the acute angle being identical for each of the plane waves, so that the plane waves undergo constructive interference in the focus plane so that a light sheet is generated. Similarly, the illumination means can also include an optical element by which a rotationally symmetric Bessel beam is generated from the light beam for dynamic generation of a light sheet.

4 Claims, 2 Drawing Sheets

(51) Int. Cl.
G02B 27/09 (2006.01)
G02B 21/10 (2006.01)
G02B 27/58 (2006.01)
G02B 26/08 (2006.01)

(52) U.S. Cl.
CPC .......... G02B 21/10 (2013.01); G02B 26/0816 (2013.01); G02B 27/58 (2013.01)

(58) Field of Classification Search
CPC .......... G01N 2201/06113; G01N 1/02; G01N 2001/028; G01N 2021/213; G01N 2021/392; G01N 2021/6419; G01N 2021/6423; G01N 2021/6471; G01N 2021/6478; G01N 2021/06; G02B 21/06; G02B 21/16; G02B 21/0076; G02B 21/0032; G02B 21/365; G02B 21/367; G02B 21/10; G02B 21/26; G02B 27/58; G02B 21/084; G02B 21/14; G02B 21/008; G02B 21/08; G02B 21/086; G02B 21/361; G02B 21/002; G02B 21/0044
USPC ................ 359/368, 370, 372, 385, 387, 389
See application file for complete search history.

(56) References Cited

U.S. PATENT DOCUMENTS

| 5,796,112 | A | | 8/1998 | Ichie | |
|---|---|---|---|---|---|
| 5,978,109 | A | * | 11/1999 | Kato et al. ................ | 359/15 |
| 6,281,993 | B1 | * | 8/2001 | Bernal et al. .............. | 359/29 |
| 7,209,293 | B2 | | 4/2007 | Gaida et al. | |
| 2006/0012866 | A1 | * | 1/2006 | Wolleschensky .... | G02B 21/082 359/385 |

FOREIGN PATENT DOCUMENTS

| DE | 10 2007 015 063 | | 10/2008 |
|---|---|---|---|
| EP | 0 248 204 | | 12/1987 |
| JP | 04-171415 | | 6/1992 |
| JP | 08-015156 | | 1/1996 |
| JP | 08015156 | A * | 1/1996 |
| JP | 2003-185930 | | 7/2003 |
| JP | 2005-070780 | | 3/2005 |
| JP | 2007-279287 | | 10/2007 |

OTHER PUBLICATIONS

Lei et al. "Structuring by Multi-Beam interference using symmetric pyramids," May 13, 2006, Optics Express vol. 14 pp. 5803- 5811.*
Botcherby et al. "Scanning two photon fluorescence microscopy with extended depth of field" Jul. 26, 2006, Optics Communications vol. 268, pp. 253-260.*
JP 08015156 English machine translation.*
STIC search results—U.S. Appl. No. 14/249,921.*
Christoph J. Engelbrecht et al., Resolution enhancement in a light-sheet-based microscope (SPIM), Optics Letters, May 15, 2006, vol. 31, No. 10.
V. Garces-Chavez et al., "Simultaneous micromanipulation in multiple planes using a self-reconstructing light beam", Nature, Sep. 12, 2002, vol. 419, pp. 145-147.
E.J. Botcherby et al., "Scanning two photon fluorescence microscopy with extended depth of field", Optics Communications, 2006, vol. 268, pp. 253-260.
Jan Huisken et al., Even fluorescence excitation by multidirectional selective plane illumination microscopy (mSPIM), Optics Letters, Sep. 1, 2007, vol. 32, No. 17, pp. 2608-2610.
Jan Huisken et al., "Optical Sectioning Deep Inside Live Embryos by Selective Plane Illumination Microscopy", Science, Aug. 13, 2004, vol. 305, pp. 1007-1009.
Rieko Arimoto et al., "Imaging properties of axicon in a scanning optical system", Applied Optics, Nov. 1, 1992, vol. 31, No. 31, pp. 6653-6657.
Notification of Transmittal of Translation of International Preliminary Report on Patentability dated Oct. 28, 2010; The International Bureau of WIPO, Switzerland.
Breuninger et al., "Lateral Modulation Boots Image Quality in a Single Plane Illumination Fluorescence Microscopy", Jul. 1, 2007, Optics Letters, vol. 32, pp. 1938-1940.
Lei et al., "Structuring by Multi-Beam Interference Using Symmetric Pyramid", May 13, 2006, Optics Express, vol. 14, pp. 5803-581I.
Botcherby et al., "Scanning Two Photon Fluorescence Microscopy with Extended Depth of Field", Jul. 26, 2000, Optics Communications, vol. 268, p. 253-260.
Japanese Office Action for application No. 2010-538415 dated Sep. 3, 2013.
Arne H. Voie et al., *Orthogonal-plane fluorescence optical sectioning: three-dimensional imaging of macroscopic biological specimens*, Journal of Microscopy, vol. 170, Pt 3, Jun. 1993, pp. 229-236.
Dan McLachlan, Jr., "*Extreme Focal Depth in Microscopy*", Sep. 1964, vol. 3, No. 9, Applied Optics.
Arne H. Voie, "*Imaging the intact guinea pig tympanic bulla by orthogonal-plane fluorescence optical sectioning microscopy*", Hearing Research 171 (2002) 119-128, *Spencer Technologies*, 701 16th Ave., Seattle, WA 98122, USA, Received Sep. 11, 2001; accepted Apr. 18, 2002.

* cited by examiner

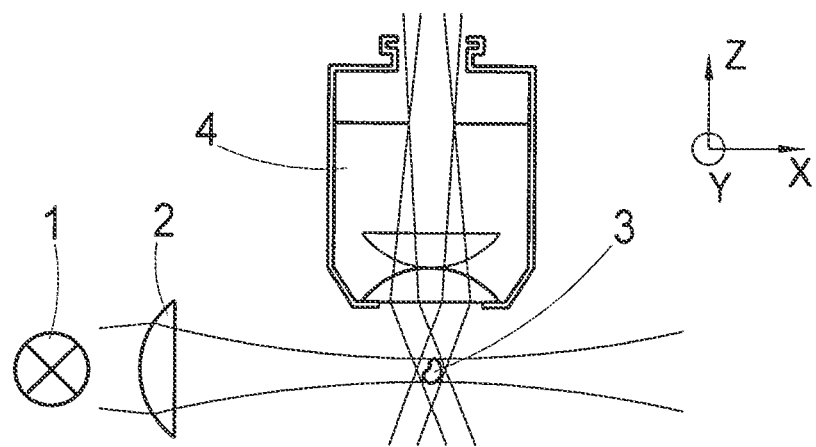
Fig.1
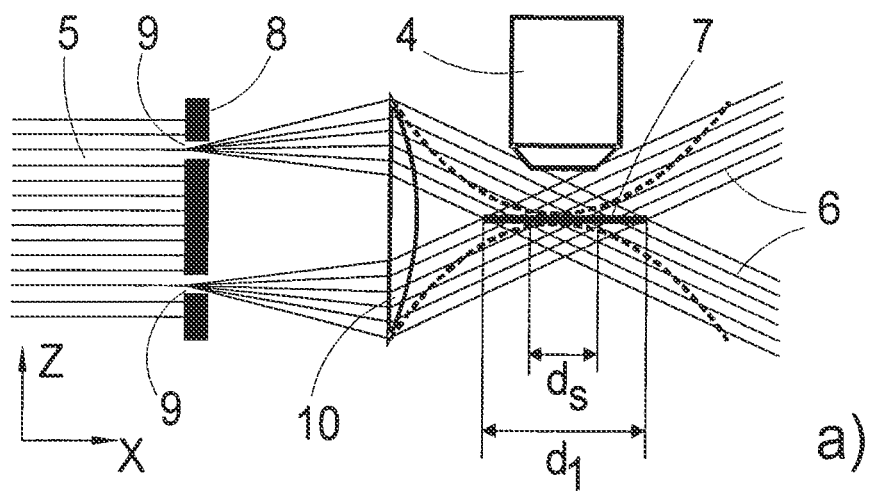
a)
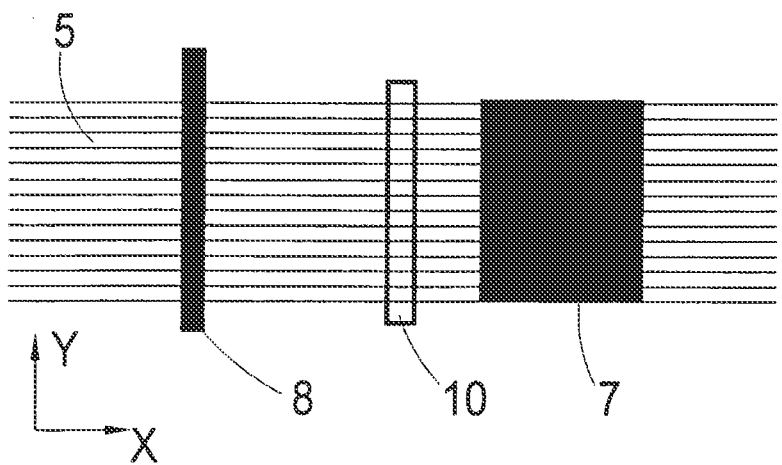
b) Fig.2

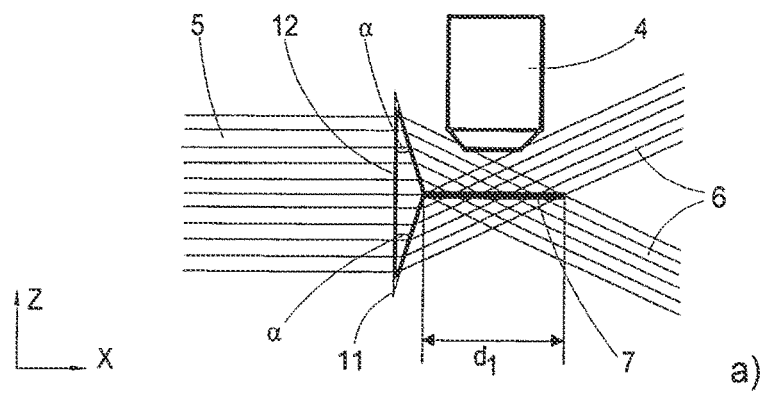
a)
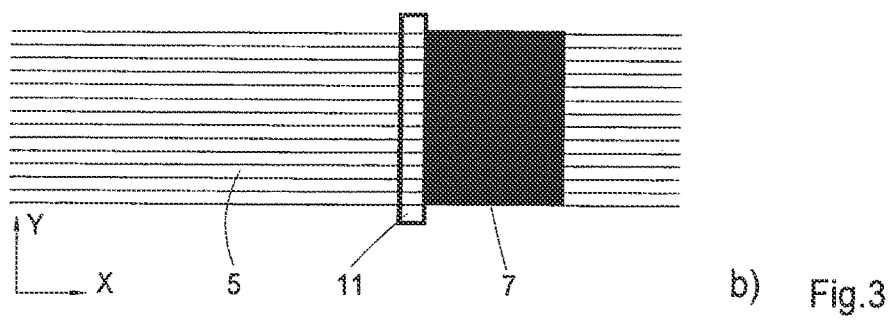
b) Fig.3
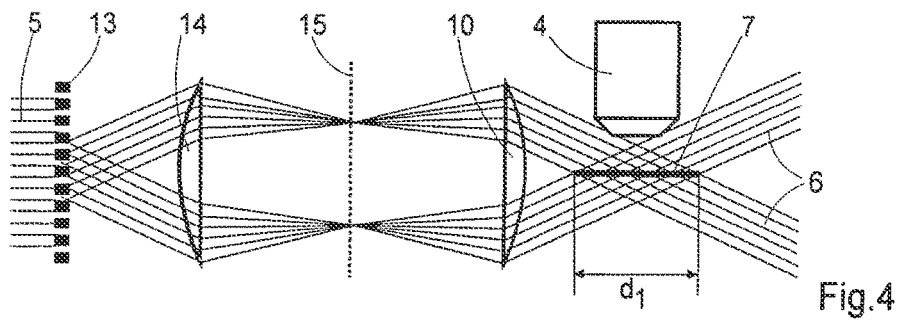
Fig.4
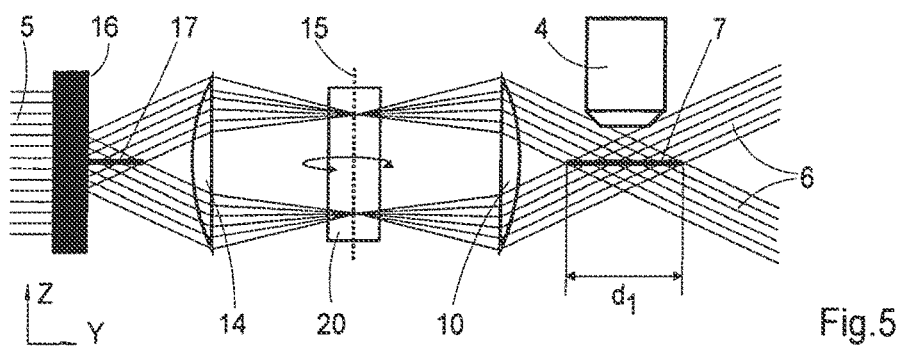
Fig.5

MICROSCOPE

The present application is a continuation of U.S. patent application Ser. No. 12/809,136 filed on Jun. 18, 2010, which claims priority from PCT Patent Application No. PCT/EP2008/010455 filed on Dec. 10, 2008, which claims priority from German Patent Application No. DE 10 2007 063 274.8 filed on Dec. 20, 2007, the disclosures of which are incorporated herein by reference in its entirety.

BACKGROUND OF THE INVENTION

Field of the Invention

The invention is directed to a microscope having an imaging objective for imaging a sample on a detector and means for illuminating the sample with a light sheet in the focus plane of the imaging objective. The illumination means comprise an illumination source which emits coherent light.

A microscope in which the illumination beam path and detection beam path are arranged substantially perpendicular to one another, and in which the sample is illuminated by a light sheet in the focus plane of the imaging objective (i.e., perpendicular to its optical axis), is designed for examining samples by selective plane illumination microscopy (SPIM). In contrast to confocal laser scanning microscopy (LSM) in which a three-dimensional sample is scanned point by point in individual planes at different depths and the image information obtained in this way is subsequently compiled to form a three-dimensional image of the sample, SPIM technology is based on widefield microscopy and makes it possible to graphically display the sample on the basis of optical sections through individual planes of the sample.

The advantages of SPIM technology include the greater speed at which image information is acquired, the reduced risk of bleaching biological samples, and an expanded penetration depth of the focus in the sample.

In principle, in the SPIM technique fluorophores, which are contained in the sample or have been introduced into the sample, are excited by laser light which is shaped into a light sheet, as it is called. A selected plane in the depth of the sample is illuminated by the light sheet and an image of this sample plane is acquired in the form of an optical section by imaging optics. The rapid back-and-forth movement of a thin rotationally symmetric laser beam in the focus plane of the imaging objective is essentially equivalent to this kind of excitation with a static light sheet. Accordingly, the shape of a light sheet results dynamically (i.e., averaged over time) over the time period of observation.

SPIM technology is described, for example, in Stelzer et al., *Optics Letters* 31, 1477 (2006), Stelzer et al., *Science* 305, 1007 (2004), DE 102 57 423 A1, and WO 2004/0530558 A1.

The known techniques have the drawback that a compromise must be made between axial resolution and field size because it is impossible in principle to generate an absolutely flat light sheet without any beam divergence. For example, if the light sheet is generated in the focus of a cylindrical lens, a hyperbolic beam profile results. The observable image field (i.e., the area in which the conditions for a flat light sheet are approximately met) corresponds, with respect to its extension along the illumination direction, to the depth of focus of the cylindrical lens being used and the optics fitted to the latter. The depth of focus in turn depends directly on the numerical aperture of the cylindrical lens and is therefore linked with the axial resolution along the optical axis of the imaging objective. As a rule, the numerical aperture is selected in such a way that the axial extension of the light sheet in the edge areas of the image field of interest is about twice as large as it is in the center of the image. The numerical apertures are typically in the range of 0.05. Therefore, the possibilities for observing large-area sample regions with high axial resolution are narrowly limited. This problem exists not only when using a static light sheet, but also when using a beam which is guided over the sample in a scanning manner.

Another prevalent problem in the known SPIM methods is shadowing in the sample. Owing to the fact that the sample is irradiated from the side, with respect to the detection direction, with a relatively low numerical aperture and that some areas in the sample have higher absorption rates or light scattering than others, there are regions behind these areas in the illumination direction which are darker in relation to their surroundings and which manifest themselves as shadows of the more absorbent, more heavily scattering area. This leads to a fringe pattern in recordings made with SPIM technology. This is the case, for example, in the arrangements described in DE 102 57 423 A1 and DE 10 2005 027 077 A1, where a rigid light sheet is generated whose thickness (i.e., whose extension along the optical axis of the imaging objective—hereinafter designated by Z) is invariable. The shadowing can be reduced when the sample plane is illuminated by a light sheet from different angles in the focus plane—the XY plane. This requires either a plurality of light sources or a moving optical element such as a scanner mirror or a spatial light modulator (SLM) such as is described in DE 10 2007 015063.8. A reduction in the shadowing effect is also achieved by successive use of two light sheets from two opposing sides, wherein the illumination angle can also be varied, which is described in an article by Huisken et al., *Optics Letters* 32 (17) 2007, pages 2608-2610. However, both the construction and subsequent evaluation are very complicated.

Shadowing also occurs in the arrangements described in EP 0248 204 B1 and U.S. Pat. No. 4,826,299. In each case, arrangements which at least reduce shadowing have complicated constructions and require a considerable number of components which must be adjusted to one another.

On the other hand, Bessel beams are non-diffractive beams whose transverse intensity profile (i.e., in a SPIM microscope, along the Z axis or optical axis of the imaging objective) does not change along the optical axis of the illumination beam (in this case, the X direction). Such Bessel beams are used, for example, to generate optical tweezers. The transverse intensity profile of these beams can be described as a Bessel function or as a superposition of Bessel functions and is usually rotationally symmetric. Optical tweezers generated by means of Bessel beams is described, for example, in an article by K. Dholakia et al., *Nature*, Vol. 419, 2002, pages 145-147. Bessel beams can be generated, for example, by conical lenses, or axicons, as is described in an article by Arimoto et al., *Applied Optics*, Vol. 31, No. 31 (1992), pages 6653-6657. A correspondingly shaped rotationally symmetric diffractive optical element (DOE) in the form of a transmission grating or phase grating can also function as an axicon. The use of a phase grating of this kind to generate Bessel beams within the framework of laser scanning microscopy for fluorescence analysis is described, for example, in an article by Wilson et al., *Optics Communications* 268 (2006), pages 253-260.

An essential property of these rotationally symmetric Bessel beams is that shadowing is limited to a small area behind the object generating a shadow. A re-forming of the Bessel beam takes place subsequently.

SUMMARY OF THE INVENTION

Therefore, it is the object of the invention to develop an arrangement which overcomes the above-mentioned disadvantages of the prior art. In particular, it is an object of the invention to generate a light sheet with an increased depth of focus in the image field, wherein shadowing is preferably also reduced or prevented in a simple manner.

This object is met in a microscope of the type described above in that the illumination means comprise Bessel optics which generate at least two plane waves from a light beam and give propagation directions for the plane waves, the propagation direction of each of the plane waves encloses an acute angle with the focus plane in each instance, the magnitude of the acute angle being identical for each of the plane waves, so that the plane waves undergo constructive interference in the focus plane so that a light sheet is generated. While the means described in the prior art for generating Bessel beams generate exclusively rotationally symmetric Bessel beams with a plurality of superimposed plane waves, only at least two plane waves are generated in the Bessel optics according to the invention. Two plane waves are generally sufficient and represent a good compromise with regard to design requirements on one hand and the quality of the light sheet on the other hand. Nevertheless, more than two plane waves can also be used. The waves run toward one another and interfere constructively in the area in which they overlap one another so that a light sheet is generated. When the Bessel optics are arranged in a corresponding manner with respect to the imaging objective, this constructive interference takes place in the focus plane. Of course, as can also be appreciated by the person skilled in the art, Bessel optics and the imaging objective can also be arranged relative to one another in such a way that the constructive interference takes place outside of the focus plane but parallel to it or also in such a way that the constructive interference takes place in a plane which is tilted relative to the focus plane. The acute angle enclosed by the two propagation directions with the focus plane, or with the plane in which the constructive interference takes place, depends on the desired image field size and, consequently, on the desired light sheet thickness. Further, owing to the side lobes occurring during the interference, lateral light sheets can occur and the angle must therefore be selected in such a way that disruption is minimized. Lasers are usually used as light sources. The light sheet generated in this way has a greater depth of focus than light sheets generated in the conventional manner (i.e., the extension of the substantially planar area of the light sheet along the illumination direction X is greater compared to conventionally generated light sheets), so that the usable section of the image field of the imaging objective is larger. Another advantage consists in that the shadowing in the illumination direction is reduced because of the special properties of Bessel beams. Therefore, illumination with light sheets from different directions in the focus plane is unnecessary. In this regard, the light beam entering the Bessel optics is often collimated through a collimator arranged in front of it, but this is not a necessary condition.

Bessel optics of the kind mentioned above can be realized in different ways. In a first embodiment of the invention, the Bessel optics comprise a diaphragm with a first slit and a second slit, both slits being situated in planes parallel to the focus plane and on different sides of the focus plane. The slits limit the incident, parallel, collimated light and act themselves as light sources which emit cylindrical light waves. The Bessel optics also comprise a first cylindrical lens. The axis of symmetry of the cylinder (i.e., the axis of rotation) lies in the focus plane. The cylindrical lens changes the waves radiating from the slits into two plane waves and deflects them onto the focus plane, where they interfere.

The distance between the two slits is selected depending on the wavelength that is used and depending on the parameters—such as refractive power and radius of curvature—of the cylindrical lens. The distance between the slits is typically in the range of 4 mm to 12 mm, for example. The width of the slits, which also determines the extension of the light sheet along the illumination direction, can range between 10 µm and 100 µm, for example. However, these values can also lie outside this range because they must ultimately be adjusted relative to the desired field size and light sheet thickness. However, use of the two slits results in light losses, and the image is darker.

This can be prevented by another embodiment of the invention. In this case, instead of a diaphragm with two slits and a cylindrical lens, the Bessel optics comprise a prism. The entry face of the prism extends perpendicular to the direction from which the light beam arrives. The prism has a non-refractive edge situated in the focus plane. As regards its function, the prism may be thought of as composed of two separate prisms joined at the base located opposite from the prism angle. While the entry faces of the two prisms are parallel, the exit faces enclose an angle of less than 90 degrees with the non-refractive edge. The prism angles are identical. In this way, the portion of the light beam extending above the focus plane is deflected in a different direction than the portion of the light beam impinging on the prism below the focus plane.

The prism angle must be correspondingly small in order for the generated plane waves to be constructively superimposed in the focus plane. The prism angle is typically between 5 degrees and 40 degrees. These values are substantially determined by the beam diameter, refractive power and/or the desired image field size. Therefore, values lying outside this range are also possible, although losses must be taken into account in some cases. In this case, the extension of the light sheet depends on the particular properties of the prism such as the index of refraction and the prism angle. The aperture of the beam can also influence the extension of the light sheet along the illumination direction (X) insofar as the entire entry face is not irradiated by light. The thickness of the light sheet along the optical axis of the imaging objective (Z) is also influenced by the prism properties, particularly the prism angle.

Instead of a prism, a DOE can also be used with the same effect; for example, the Bessel optics can have a phase grating or transmission grating. This is positioned in an intermediate image plane of the illumination beam path. The two plane waves which interfere with each other can be, for example, the wavetrains of the positive and negative first-order diffraction of the grating. Higher-order diffractions can also be used. The unwanted light component of the zeroth-order diffraction is preferably cut out, the Bessel optics having corresponding means for this purpose, for example, a beam trap which is arranged centrally in a pupil plane downstream of the intermediate image plane in the beam path.

As in the case of a prism, the use of a cylindrical lens is not mandatory when the grating or the prism can be arranged in the immediate vicinity of the focus plane because the waves interfere with each other immediately after exiting from the prism or grating. If an arrangement of this kind is not possible, additional optical elements can be used. The Bessel optics then preferably have a first cylindrical lens and a second cylindrical lens, and the prism or phase grating or transmission grating, first cylindrical lens and second cylindrical lens are designed and arranged corresponding to 4f geometry. The prism or grating is situated in the illumination-side focal plane of the first cylindrical lens, the optical axis of the imaging objective is located approximately in the area of the object-side focal plane of the second cylindrical lens. The first cylindrical lens and second cylindrical lens are constructed substantially identically, but are arranged in a mirror-symmetric manner. The mirror plane is situated in the object-side focal length of the first cylindrical lens and the illumination-side focal plane of the second cylindrical lens. The focal lengths of the lenses are identical so that the prism or grating and the sample are situated at four-times the distance of the focal length f of the cylindrical lenses relative to one another. This 4f arrangement offers the advantage that the light in that focal plane common to the first cylindrical lens and second cylindrical lens, also known as the Fourier plane, can be manipulated in different ways. For example, the Bessel optics can have a kind of apodizing diaphragm in the Fourier plane which cuts out the zeroth-order diffraction of the grating being used.

An optical arrangement with 4f geometry in the Bessel optics can be used in an advantageous manner when the prism or phase grating or transmission grating cannot be arranged as close as would be required in the focus plane, for example, for reasons of space.

While all of the arrangements described above are based on the use of a static light sheet, the last optical arrangement with 4f geometry described above can also be modified in such a way that it can be used for generating a dynamic light sheet which has the same advantages with respect to depth of focus and shadowing. In this case, the means for illumination in the microscope described above have an optical element by which a rotationally symmetric Bessel beam is generated from the light beam. The optical element can preferably be an annular diaphragm, an axicon, or a phase mask and has rotational symmetry around the optical axis. The illumination means further comprise a first lens and a second lens which, in this instance, are not cylindrical lenses, but lenses which are rotationally symmetric around the optical axis. The optical element, first lens and second lens are designed and arranged corresponding to a 4f geometry with a Fourier plane between the two lenses. In this way, the Bessel beam is imaged in the focus plane of the imaging objective. Finally, the means for illumination also comprise scanning means by which the Bessel beam scans the sample in the focus plane of the imaging objective. The scanning means can be designed, for example, as a rotating mirror with an axis of rotation in the Fourier plane.

It will be understood that the features described above and those to be described in the following can be used not only in the indicated combinations but also in other combinations or by themselves without departing from the framework of the present invention.

BRIEF DESCRIPTION OF THE DRAWINGS

FIG. 1 shows the basic construction of a SPIM microscope;

FIG. 2 shows the operating principle of illumination optics with slit mask and cylindrical lens;

FIG. 3 shows illumination optics with a prism;

FIG. 4 shows a 4f arrangement with a phase mask; and

FIG. 5 shows a 4f arrangement with a dynamic light sheet.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

FIG. 1 shows the basic construction of a SPIM microscope. The light from an illumination source 1 is shaped by illumination optics 2 to form a light sheet and is deflected on a sample 3. The sample and the light sheet are located in the focus plane of an imaging objective 4. The optical axis of the imaging objective 4 extends perpendicular to the direction from which the sample 3 is illuminated. The illumination optics 2 generally comprise a plurality of optical elements which collimate the coherent light of the illumination source 1 and shape a light sheet therefrom. In the prior art, the illumination optics 2 generally also have a cylindrical lens whose flat side faces the sample and whose curved side faces in direction of the illumination source. Some examples of illumination optics 2 which make it possible to generate a light sheet with increased depth of focus and reduced shadowing compared to the arrangements known from the prior art will be described in the following.

FIG. 2 shows a first arrangement of the kind mentioned above, FIG. 2a shows a side view corresponding to the view in FIG. 1, and FIG. 2b shows a view corresponding, for example, to a top view from the direction of the imaging objective 4. The arrangement shown in FIG. 2 has Bessel optics which generate two plane waves 6 from a collimated beam 5. In so doing, the Bessel optics give propagation directions for the plane waves 6 in such a way that each of the propagation directions of the plane waves encloses an acute angle with the focus plane of the imaging objective 4. The angle of both plane waves is identical; however, the absolute value is positive in one case and negative in the other so that both plane waves impinge on the focus plane from different sides. They interfere constructively so that a light sheet 7 is generated.

The Bessel optics shown in FIG. 2 comprises a diaphragm 8 with two slits 9. Both slits 9 lie in planes parallel to the focus plane, but on different sides of the focus plane. The two approximately cylindrical waves proceeding from the slits 9 are shaped by a first cylindrical lens 10 to form the plane waves 6 and are deflected to the focus plane. The axis of rotation of the cylindrical lens lies in the focus plane. The diaphragm 8 is arranged in a pupil plane of the illumination beam path.

The light sheet 7 which is generated in this way has an increased depth of focus in the observation direction Z compared to light sheets generated in a conventional manner. The reason for this is that the light sheet 7 generated in this way actually adopts a substantially planar shape in a larger area along the illumination direction X, namely, in the area where the plane waves 6 constructively interfere. This area is indicated by $d_1$ in FIG. 2a. For purposes of comparison, the conventional shape of the light sheet is represented by the dashed line. The area that is actually usable then has an extension of only $d_s$ in X direction. The extension $d_1$ depends upon the width of the slits 9 that are used. In principle, the wider these slits, the greater the area which is available for constructive interference. Owing to the special properties of Bessel beams, shadowing is also reduced because the Bessel beams re-form in the focus plane at a relatively short distance from a sample 3.

A drawback in this arrangement consists in that the available amount of light is greatly reduced by the two slits 9. Accordingly, brightness is sharply reduced. This can be prevented by means of the arrangement shown in FIG. 3. Like FIG. 2, FIG. 3 shows a side view of the microscope corresponding to the view in FIG. 1, and FIG. 3b shows a top view from the direction of the imaging objective 4. In this case, the Bessel optics have a prism 11 instead of a diaphragm with two slits and a cylindrical lens. The material of the prism 11 is generally selected depending on the wavelength of the light. The prism 11 can also be designed so as to be exchangeable so that, for example, when the wavelength changes, the prism 11 is also changed. This can also be achieved automatically with a mechanism provided for this purpose. In order to achieve the desired effect of constructive interference, the prism 11 must have a small prism angle $\alpha$. It usually ranges between 5 degrees and 40 degrees, but can also lie outside this range. The extension of the light sheet 7 in X direction and its thickness in Z direction are influenced by the prism properties, particularly the prism angle $\alpha$. The smaller the prism angle $\alpha$, the smaller the acute angle enclosed by the propagation directions of the plane waves and the focus plane. This results in a larger extension of the light sheet in Z direction, but also in X direction so that a suitable compromise must be found. The prism 11 has an entry face 12 which extends perpendicular to the beam direction of the light beam 5. The prism 11 is generally manufactured in one piece, but can also be composed of two identical prisms which are joined at their bases opposite the prism angle $\alpha$, and the bases of the prisms are located in the focus plane. The two exit faces form a non-refractive edge in the focus plane. In this way, the portion of the light beam 5 extending above the focus plane is deflected in a different direction than the portion of the light beam 5 in the lower half.

As in the arrangement shown in FIG. 2, the focus plane serves in this case only as a reference. Of course, it is possible, if required by the application, to arrange the optical axis of the imaging objective 4 at a different angle to the illumination direction. This is also considered just as a design feature of the described arrangements.

Instead of a prism 11, a correspondingly designed diffractive optical element, for example, a phase grating or transmission grating, can also be used. This is positioned in an intermediate image plane of the illumination beam path. The two plane waves 6 correspond to the positive and negative first-order diffraction of the grating. The grating can be designed in such a way that the zeroth-order diffraction is suppressed.

If it is not possible (e.g., because of limited space, to position the prism 11 or the grating in the immediate vicinity of the imaging objective 4), this can be remedied, for example, by imaging the grating or prism 11 in the focus plane by means of an optical arrangement with 4f geometry. An arrangement of this kind is shown by way of example in FIG. 4 for a phase grating 13. The light beam 5 is diffracted at the phase grating 13, the zeroth-order diffraction is cut out, the positive and negative first-order diffractions continue to be used. The phase grating 13 is located in the focal plane of a second cylindrical lens 14 which images the plane waves 6, corresponding to their frequency, on points in the sample-side focal plane which, for this reason, is also known as a Fourier plane 15. The frequency domain can be manipulated in this Fourier plane 15; for example, an apodizing diaphragm can be introduced.

The Fourier plane 15 is at the same time also the illumination-side focal plane of the first cylindrical lens 10 which again generates plane waves 6 in a corresponding manner and images them on the focus plane, where they undergo constructive interference. The sample-side focal plane of the first cylindrical lens 10 is situated approximately in the area of the optical axis of the imaging objective 4.

While all of the arrangements shown thus far are provided for generating a static light sheet 7 based on the constructive interference of two plane waves, rotationally symmetric Bessel beams (i.e., non-diffractive beams whose transverse (Y, Z) intensity profile does not change along the optical axis of the illumination beam X) can also be used to generate a dynamic light sheet 7. An arrangement of this kind is shown by way of example in FIG. 5. A rotationally symmetric Bessel beam 17 is generated from the coherent and collimated light beam 5 by means of an optical element 16. The optical element 16 can be, for example, an annular diaphragm, an axicon, or a correspondingly designed phase mask. A spatial light modulator (SLM) can also be used. Here again, only two plane waves 6 are shown by way of example, but the Bessel beam 17 is a rotationally symmetric superposition of many plane waves.

The Bessel beam 17 is imaged in the focus plane of the imaging objective 4 by a first lens 18 and a second lens 19 which are arranged together with the optical element 16 corresponding to a 4f geometry. Again, only a line-shaped region is illuminated. However, a rotating mirror 20 whose axis of rotation lies in the Fourier axis 15 is located in the Fourier plane 15 between the two lenses 18 and 19 and guides the Bessel beam 17 in the focus plane over the sample 3. An dynamic light sheet is generated in this way.

By means of the arrangements described above, the depth of focus of the light sheet 7 in SPIM microscopy can be increased in the illumination direction so that a larger image field is available for observation. At the same time, shadowing can be reduced.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

REFERENCE NUMBERS 1 illumination source
2 illumination optics
3 sample
4 imaging objective
5 light beam
6 plane wave
7 light sheet
8 diaphragm
9 slit
10 first cylindrical lens
11 prism 12 entry face
13 phase grating
14 second cylindrical lens
15 Fourier plane
16 optical element
17 Bessel beam
18 first lens
19 second lens
20 rotating mirror
α prism angle
$d_l$, $d_s$ extension of the light sheet
X illumination direction
Z observation direction

The invention claimed is:

1. A microscope comprising:
   an imaging objective for imaging a sample on a detector and having a focus plane where the sample is located; and
   means for illuminating the sample with a light sheet in the focus plane of the imaging objective;
   wherein the illumination means comprise:
     an illumination source which emits coherent light;
     an optical element by which a rotationally symmetric Bessel beam is generated;
     a first lens;
     a second lens; and
     scanning means by which the Bessel beam scans the sample in the focus plane of the imaging objective
   wherein the optical element, the first lens, and the second lens are designed and arranged corresponding to a 4f geometry with a Fourier plane between the first and second lenses so that the Bessel beam is imaged in the focus plane of the imaging objective,
   wherein the illumination means is configured to generate constructive interference by the Bessel beam at the focus plane to produce the light sheet, and
   wherein an optical axis of the imaging objective extends perpendicular to an illumination direction.

2. The microscope according to claim 1, wherein the second lens generates two plane waves and gives propagation directions to the two plane waves that are at acute angles to the focus plane of the imaging objective such that the two plane waves constructively interfere with each other at the focus plane to produce the light sheet.

3. The microscope according to claim 2, wherein the two plane waves run toward the focus plane from a same side of the imaging objective.

4. The microscope according to claim 1, wherein, at the focus plane, the optical axis of the imaging objective extends perpendicular to the illumination direction.

* * * * *